United States Patent
Puzzo (10) Patent No.: US 11,495,980 B1
(45) Date of Patent: Nov. 8, 2022

(54) CLAMP ON POWER CORD USB CHARGER

(71) Applicant: Garrett Puzzo, Sarasota, FL (US)

(72) Inventor: Garrett Puzzo, Sarasota, FL (US)

( * ) Notice: Subject to any disclaimer, the term of this patent is extended or adjusted under 35 U.S.C. 154(b) by 53 days.

(21) Appl. No.: 17/241,176

(22) Filed: Apr. 27, 2021

(51) Int. Cl.
 *H02J 7/00* (2006.01)
 *H02J 7/02* (2016.01)

(52) U.S. Cl.
 CPC .............. *H02J 7/0042* (2013.01); *H02J 7/02* (2013.01); *H02J 2207/30* (2020.01)

(58) Field of Classification Search
 CPC .................................. H02J 7/0042; H02J 7/02
 USPC .......................................................... 320/107
 See application file for complete search history.

(56) References Cited

U.S. PATENT DOCUMENTS

| | | | |
|---|---|---|---|
| 2,673,968 A | 3/1954 | Smith | |
| 2,720,635 A | 10/1955 | Odegaard | |
| 7,646,259 B2 * | 1/2010 | Chang | H01R 24/52 439/387 |
| 7,736,033 B2 | 6/2010 | Patel | |
| 8,303,330 B2 | 11/2012 | Temblador | |
| D734,259 S | 7/2015 | Cepress | |
| 9,463,564 B2 | 10/2016 | Macauda | |
| 9,979,116 B2 * | 5/2018 | Hinsch | H01R 9/2408 |
| 10,033,203 B1 * | 7/2018 | Snyder, Jr. | H01R 4/2406 |
| 2007/0130483 A1 * | 6/2007 | Wu | G06F 1/26 713/300 |
| 2013/0260619 A1 * | 10/2013 | Wallner | H01R 13/629 439/709 |
| 2014/0256165 A1 * | 9/2014 | Chang | H01R 24/50 439/153 |
| 2017/0104297 A1 | 4/2017 | Scott | |
| 2018/0076556 A1 * | 3/2018 | Hinsch | H01R 4/2433 |
| 2018/0233846 A1 * | 8/2018 | Hinsch | H01R 13/6675 |

FOREIGN PATENT DOCUMENTS

WO          2010045547          4/2010

* cited by examiner

*Primary Examiner* — Suchin Parihar
(74) *Attorney, Agent, or Firm* — Kyle A. Fletcher, Esq.

(57) ABSTRACT

The clamp on power cord USB charger is an electric energy distribution device. The clamp on power cord USB charger draws ac electric energy from the national electric grid by tapping into the cable of an electric device. The converts the drawn ac electric energy into dc electric energy. The clamp on power cord USB charger distributes the dc electric energy in a manner suitable for use by USB devices. The clamp on power cord USB charger comprises a pan, a lid, a fastening structure, and a rectifying circuit. The pan, the lid, and the fastening structure enclose the rectifying circuit. The rectifying circuit: a) taps into the cable to draw ac electric energy from national electric grid; and, b) converts the drawn ac electric energy into dc electric energy.

15 Claims, 5 Drawing Sheets

CLAMP ON POWER CORD USB CHARGER

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of electricity and electric connections including connections using contact members penetrating or cutting insulation or cable strands the contact members having teeth, prongs, pins or needles penetrating the insulation having needles or pins. (H01R4/2406)

SUMMARY OF INVENTION

The clamp on power cord USB charger is an electric energy distribution device. The clamp on power cord USB charger draws ac electric energy from the national electric grid by tapping into the cable of an electric device. The clamp on power cord USB charger converts the drawn ac electric energy into dc electric energy. The clamp on power cord USB charger distributes the dc electric energy in a manner suitable for use by USB devices. The clamp on power cord USB charger comprises a pan, a lid, a fastening structure, and a rectifying circuit. The pan, the lid, and the fastening structure enclose the rectifying circuit. The rectifying circuit: a) taps into the cable to draw ac electric energy from national electric grid; and, b) converts the drawn ac electric energy into dc electric energy.

These together with additional objects, features and advantages of the clamp on power cord USB charger will be readily apparent to those of ordinary skill in the art upon reading the following detailed description of the presently preferred, but nonetheless illustrative, embodiments when taken in conjunction with the accompanying drawings.

In this respect, before explaining the current embodiments of the clamp on power cord USB charger in detail, it is to be understood that the clamp on power cord USB charger is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the clamp on power cord USB charger.

It is therefore important that the claims be regarded as including such equivalent construction insofar as they do not depart from the spirit and scope of the clamp on power cord USB charger. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

The clamp on power cord USB charger is an electric energy distribution device. The clamp on power cord USB charger draws ac electric energy from the national electric grid by tapping into the cable of an electric device. The clamp on power cord USB charger converts the drawn ac electric energy into dc electric energy. The clamp on power cord USB charger distributes the dc electric energy in a manner suitable for use by USB devices. The clamp on power cord USB charger comprises a pan, a lid, a fastening structure, and a rectifying circuit. The pan, the lid, and the fastening structure enclose the rectifying circuit. The rectifying circuit: a) taps into the cable to draw ac electric energy from national electric grid; and, b) converts the drawn ac electric energy into dc electric energy.

Specification:

Detailed reference will now be made to one or more potential embodiments of the disclosure, which are illustrated in FIGS. 1 through 7.

The clamp on power cord USB charger 100 (hereinafter invention) is an electric energy distribution device. The clamp on power cord USB charger draws ac electric energy from the national electric grid 141 by tapping into the cable 151 of an electric device 154. The invention 100 converts the drawn ac electric energy into dc electric energy. The invention 100 distributes the dc electric energy in a manner suitable for use by USB devices. The invention 100 comprises a pan structure 101, a lid structure 102, a fastening structure 103, and a rectifying circuit 104. The pan structure 101, the lid structure 102, and the fastening structure 103 enclose the rectifying circuit 104. The rectifying circuit 104: a) taps into the cable 151 to draw ac electric energy from national electric grid 141; and, b) converts the drawn ac electric energy into dc electric energy.

Figure 1:
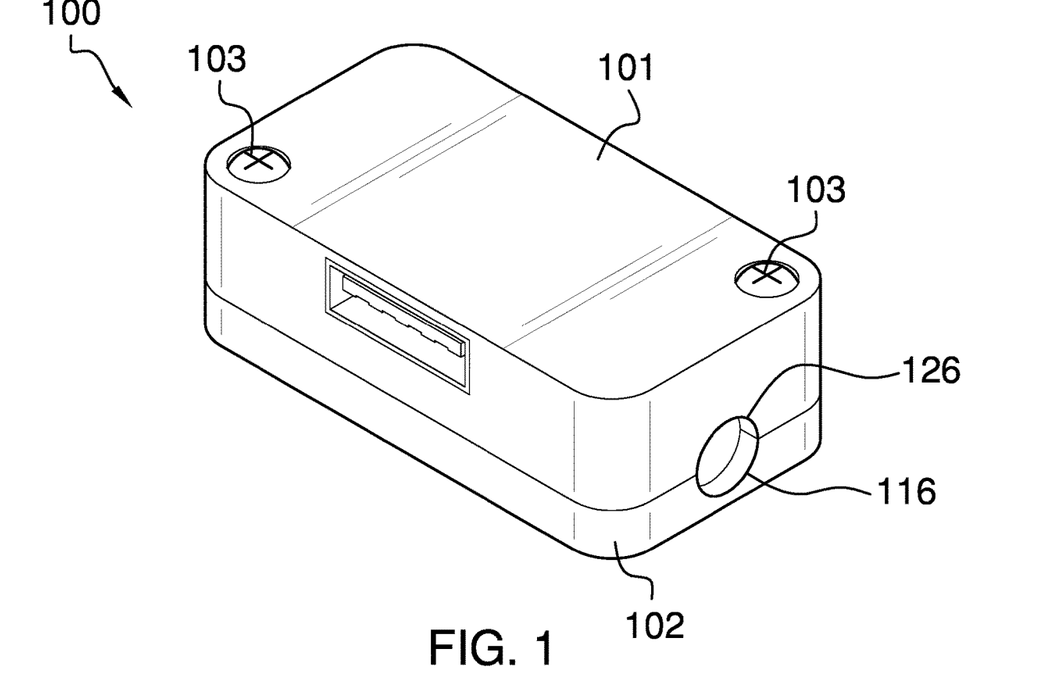
FIG. 1 is a perspective view of an embodiment of the disclosure.
Figure 2:
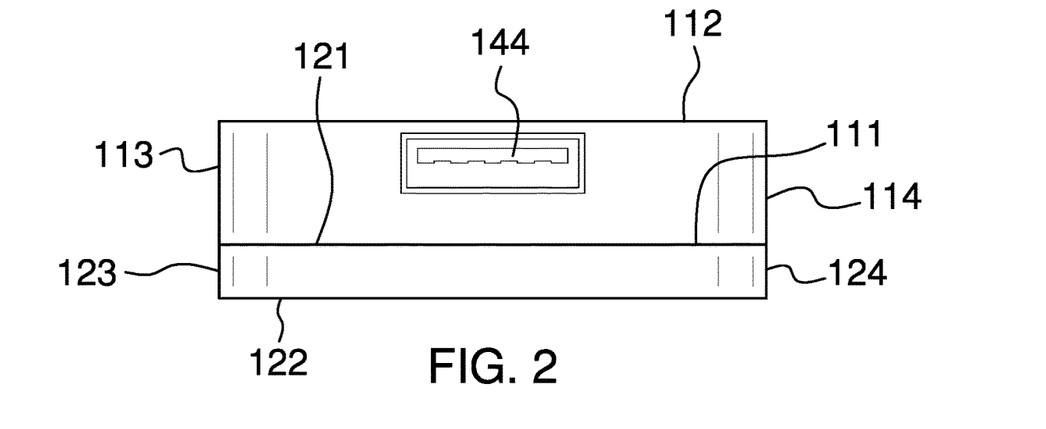
FIG. 2 is a front view of an embodiment of the disclosure.
Figure 3:
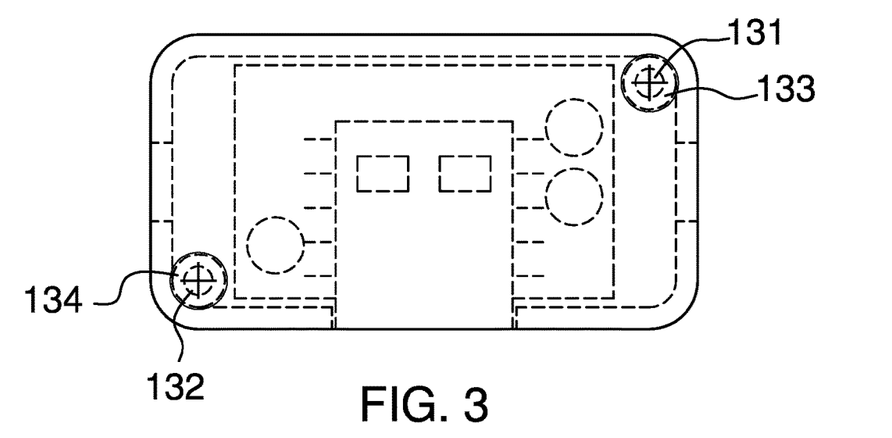
FIG. 3 is a top view of an embodiment of the disclosure.
Figure 4:
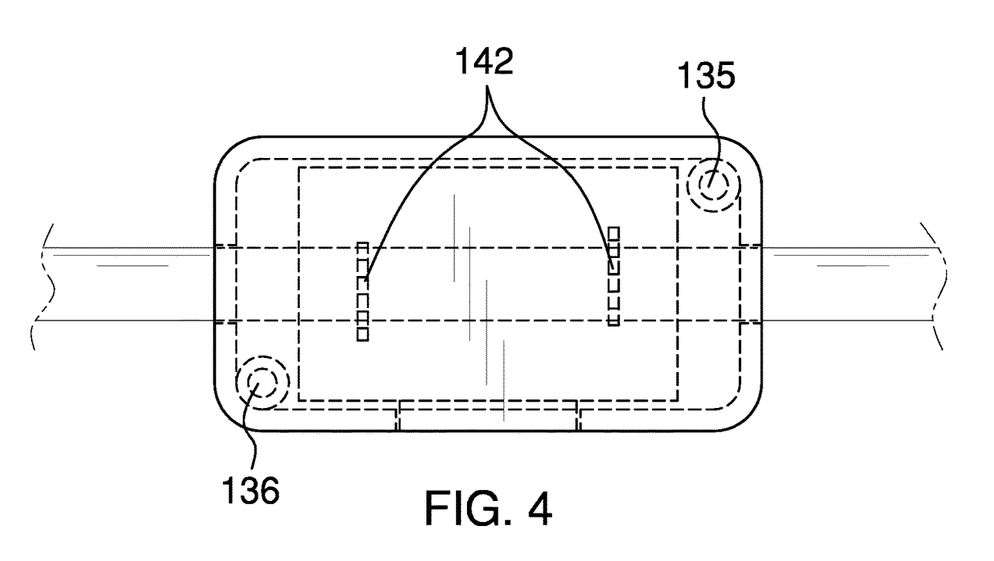
FIG. 4 is a bottom view of an embodiment of the disclosure.
Figure 5:
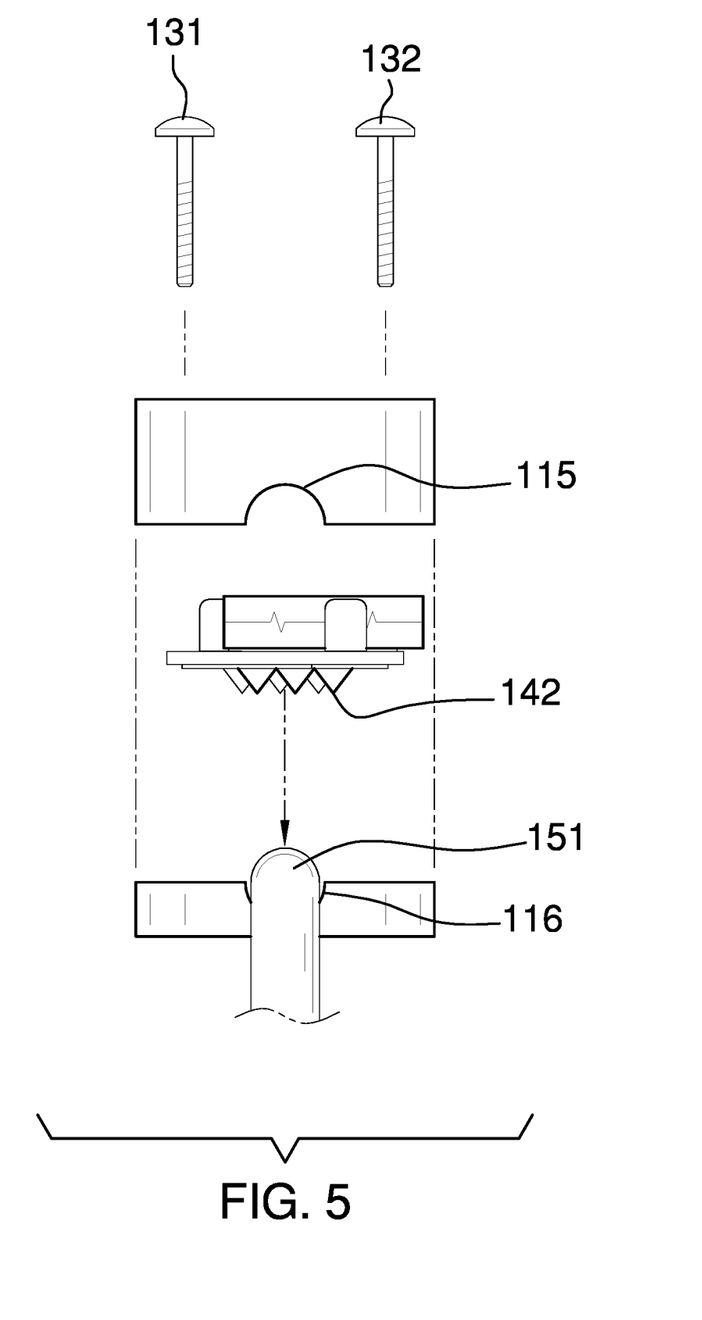
FIG. 5 is an exploded view of an embodiment of the disclosure.
Figure 6:
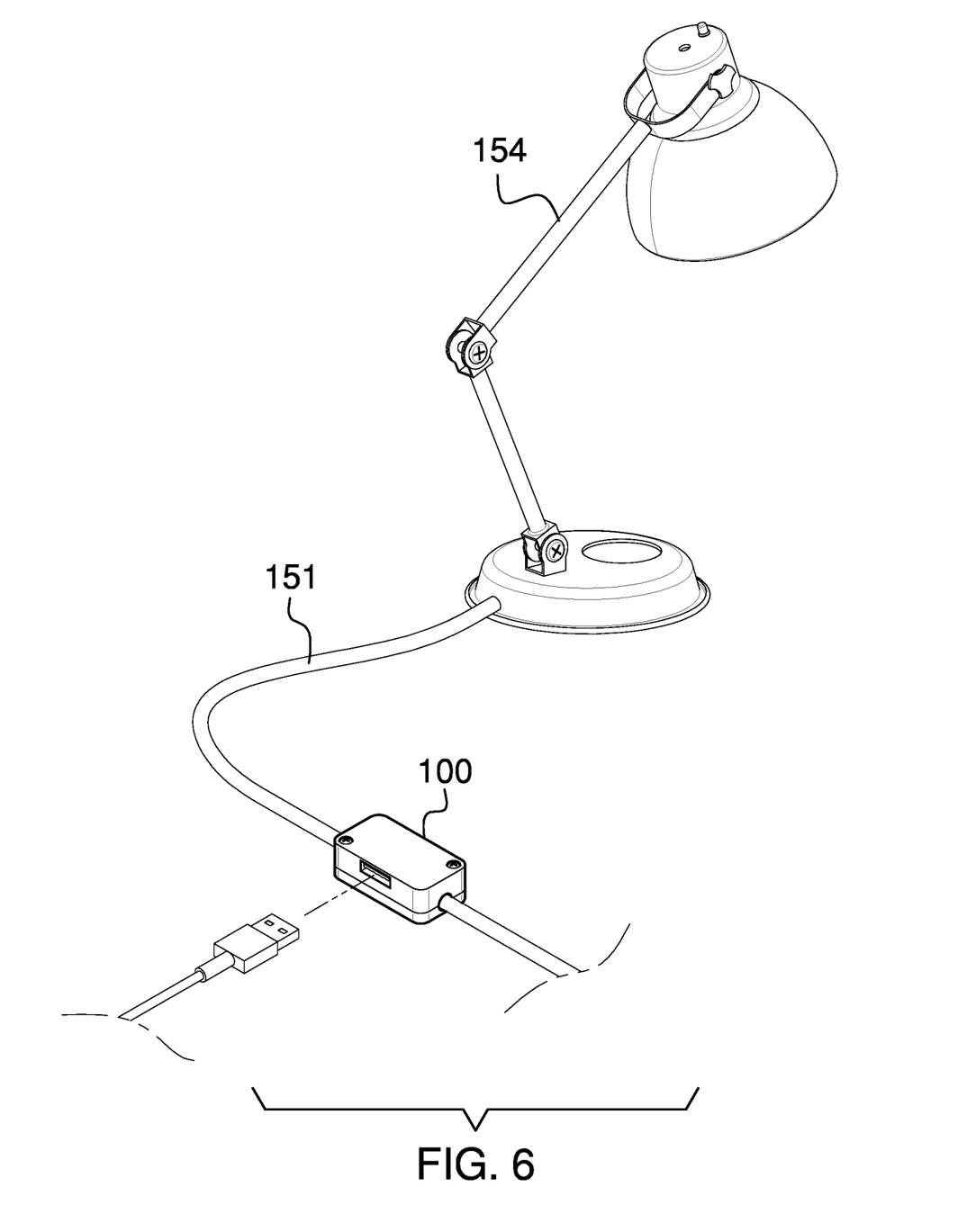
FIG. 6 is an in-use view of an embodiment of the disclosure.

The pan structure 101 is a prism-shaped structure. The pan structure 101 has a pan shape. The pan structure 101 is a hollow structure. The pan structure 101 forms a portion of the housing of the rectifying circuit 104. The pan structure 101 is formed with all the form factors and apertures necessary to operate the rectifying circuit 104. The pan structure 101 comprises a pan structure 101 open face 111, a pan structure 101 closed face 112, a first pan structure 101 lateral face 113, and a second pan structure 101 lateral face 114.

The pan structure 101 open face 111 is a congruent end of the prism structure of the pan structure 101. The pan structure 101 open face 111 is the open face of the pan structure of the pan structure 101. The cable 151 inserts into the pan structure 101 through the pan structure 101 open face 111. The pan structure 101 closed face 112 is a congruent end of the prism structure of the pan structure 101. The pan structure 101 closed face 112 is the closed face of the pan structure of the pan structure 101. The pan structure 101 closed face 112 is the congruent end that is distal from the pan structure 101 open face 111.

The first pan structure 101 lateral face 113 is the lateral face of the prism structure of the pan structure 101 with the least surface area. The cable 151 passes through the first pan structure 101 lateral face 113. The second pan structure 101 lateral face 114 is the lateral face of the prism structure of the pan structure 101 that is distal from the first pan structure 101 lateral face 113. The cable 151 passes through the second pan structure 101 lateral face 114. The first pan structure 101 lateral face 113 further comprises a first pan structure 101 notch 115. The second pan structure 101 lateral face 114 further comprises a second pan structure 101 notch 116.

The first pan structure 101 notch 115 is a notch that is formed through the first pan structure 101 lateral face 113. The first pan structure 101 notch 115 forms a negative space in the first pan structure 101 lateral face 113. The position of the first pan structure 101 notch 115 is at a location proximal to the pan structure 101 open face 111. The first pan structure 101 notch 115 is geometrically similar to the cable 151. The first pan structure 101 notch 115 is sized such that the cable 151 lays within the first pan structure 101 notch 115 as the cable 151 passes through the first pan structure 101 lateral face 113.

The second pan structure 101 notch 116 is a notch that is formed through the second pan structure 101 lateral face 114. The second pan structure 101 notch 116 forms a negative space in the second pan structure 101 lateral face 114. The position of the second pan structure 101 notch 116 is at a location proximal to the pan structure 101 open face 111. The second pan structure 101 notch 116 is geometrically similar to the cable 151. The second pan structure 101 notch 116 is sized such that the cable 151 lays within the second pan structure 101 notch 116 as the cable 151 passes through the second pan structure 101 lateral face 114.

The first pan structure 101 notch 115 aligns with the second pan structure 101 notch 116 such that the cable 151 passes straight through the pan structure 101.

The lid structure 102 is a prism-shaped structure. The lid structure 102 has a pan shape. The lid structure 102 is a hollow structure. The lid structure 102 is geometrically similar to the pan structure 101 open face 111 such that the lid structure 102 encloses the pan structure 101 open face 111. The lid structure 102 forms a portion of the housing of the rectifying circuit 104. The lid structure 102 is formed with all the form factors and apertures necessary to operate the rectifying circuit 104. The lid structure 102 comprises a lid structure 102 open face 121, a lid structure 102 closed face 122, a first lid structure 102 lateral face 123, and a second lid structure 102 lateral face 124.

The lid structure 102 open face 121 is a congruent end of the prism structure of the lid structure 102. The lid structure 102 open face 121 is the open face of the pan structure of the lid structure 102. The cable 151 inserts into the lid structure 102 through the lid structure 102 open face 121. The lid structure 102 closed face 122 is a congruent end of the prism structure of the lid structure 102. The lid structure 102 closed face 122 is the closed face of the pan structure of the lid structure 102. The lid structure 102 closed face 122 is the congruent end that is distal from the lid structure 102 open face 121.

The first lid structure 102 lateral face 123 is the lateral face of the prism structure of the lid structure 102 with the least surface area. The cable 151 passes through the first lid structure 102 lateral face 123. The second lid structure 102 lateral face 124 is the lateral face of the prism structure of the lid structure 102 that is distal from the first lid structure 102 lateral face 123. The cable 151 passes through the second lid structure 102 lateral face 124. The first lid structure 102 lateral face 123 further comprises a first lid structure 102 notch 125. The second lid structure 102 lateral face 124 further comprises a second lid structure 102 notch 126.

The first lid structure 102 notch 125 is a notch that is formed through the first lid structure 102 lateral face 123. The first lid structure 102 notch 125 forms a negative space in the first lid structure 102 lateral face 123. The position of the first lid structure 102 notch 125 is at a location proximal to the lid structure 102 open face 121. The first lid structure 102 notch 125 is geometrically similar to the cable 151. The first lid structure 102 notch 125 is sized such that the cable 151 lays within the first lid structure 102 notch 125 as the cable 151 passes through the first lid structure 102 lateral face 123.

The second lid structure 102 notch 126 is a notch that is formed through the second lid structure 102 lateral face 124. The second lid structure 102 notch 126 forms a negative space in the second lid structure 102 lateral face 124. The position of the second lid structure 102 notch 126 is at a location proximal to the lid structure 102 open face 121. The second lid structure 102 notch 126 is geometrically similar to the cable 151. The second lid structure 102 notch 126 is sized such that the cable 151 lays within the second lid structure 102 notch 126 as the cable 151 passes through the second lid structure 102 lateral face 124.

The first lid structure 102 notch 125 aligns with the second lid structure 102 notch 126 such that the cable 151 passes straight through the lid structure 102.

The lid structure 102 open face 121 aligns with the pan structure 101 open face 111 when the lid structure 102 encloses the pan structure 101. The first lid structure 102 notch 125 aligns with the first pan structure 101 notch 115 when the lid structure 102 encloses the pan structure 101. The second lid structure 102 notch 126 aligns with the second pan structure 101 notch 116 when the lid structure 102 encloses the pan structure 101. The first pan structure 101 notch 115 and the first lid structure 102 notch 125 enclose the cable 151 when the lid structure 102 encloses the pan structure 101. The second pan structure 101 notch 116 and the second lid structure 102 notch 126 enclose the cable 151 when the lid structure 102 encloses the pan structure 101.

The fastening structure 103 secures the lid structure 102 to the pan structure 101 to form a protection space that contains the rectifying circuit 104. The fastening structure 103 comprises a first bolt 131, a second bolt 132, a first pan structure 101 nut 133, a second pan structure 101 nut 134, a first lid structure 102 nut 135, and a second lid structure 102 nut 136.

The first bolt 131 is a threaded structure known as a bolt. The first bolt 131 is formed with an exterior screw thread. The bolt is defined elsewhere in this disclosure. The first bolt 131 secures the lid structure 102 to the pan structure 101. The first bolt 131 forms a threaded connection with the lid structure 102 and the pan structure 101 by simultaneously screwing into the first lid structure 102 nut 135 and the first pan structure 101 nut 133.

The second bolt 132 is a threaded structure known as a bolt. The second bolt 132 is formed with an exterior screw thread. The bolt is defined elsewhere in this disclosure. The second bolt 132 secures the lid structure 102 to the pan structure 101. The second bolt 132 forms a threaded connection with the lid structure 102 and the pan structure 101 by simultaneously screwing into the second lid structure 102 nut 136 and the second pan structure 101 nut 134.

The first pan structure 101 nut 133 is a threaded structure known as a bolt. The first pan structure 101 nut 133 is formed with an interior screw thread. The nut is defined elsewhere in this disclosure. The first pan structure 101 nut 133 is sized to receive the first bolt 131. The first pan structure 101 nut 133 mounts in a fixed position within the hollow interior of the pan structure 101 such that the first pan structure 101 nut 133 is accessible to the first bolt 131 through the pan structure 101 open face 111.

The second pan structure 101 nut 134 is a threaded structure known as a bolt. The second pan structure 101 nut 134 is formed with an interior screw thread. The nut is defined elsewhere in this disclosure. The second pan structure 101 nut 134 is sized to receive the second bolt 132. The second pan structure 101 nut 134 mounts in a fixed position within the hollow interior of the pan structure 101 such that the second pan structure 101 nut 134 is accessible to the second bolt 132 through the pan structure 101 open face 111.

The first lid structure 102 nut 135 is a threaded structure known as a bolt. The first lid structure 102 nut 135 is formed with an interior screw thread. The nut is defined elsewhere in this disclosure. The first lid structure 102 nut 135 is sized to receive the first bolt 131. The first lid structure 102 nut 135 mounts in a fixed position within the hollow interior of the lid structure 102 such that the first lid structure 102 nut 135 is accessible to the first bolt 131 through the lid structure 102 closed face 122.

The second lid structure 102 nut 136 is a threaded structure known as a bolt. The second lid structure 102 nut 136 is formed with an interior screw thread. The nut is defined elsewhere in this disclosure. The second lid structure 102 nut 136 is sized to receive the second bolt 132. The second lid structure 102 nut 136 mounts in a fixed position within the hollow interior of the lid structure 102 such that the second lid structure 102 nut 136 is accessible to the second bolt 132 through the pan structure 101 closed face 112.

The first lid structure 102 nut 135 mounts in a position within the lid structure 102 such that the first pan structure 101 nut 133 aligns with the first lid structure 102 nut 135 when the lid structure 102 encloses the pan structure 101.

The first lid structure 102 nut 135 aligns with the first pan structure 101 nut 133 such that the first bolt 131 can simultaneously screw through both the first lid structure 102 nut 135 and the first pan structure 101 nut 133. The second lid structure 102 nut 136 mounts in a position within the lid structure 102 such that the second pan structure 101 nut 134 aligns with the second lid structure 102 nut 136 when the lid structure 102 encloses the pan structure 101. The second lid structure 102 nut 136 aligns with the second pan structure 101 nut 134 such that the second bolt 132 can simultaneously screw through both the second lid structure 102 nut 136 and the first pan structure 101 nut 133.

Figure 7:
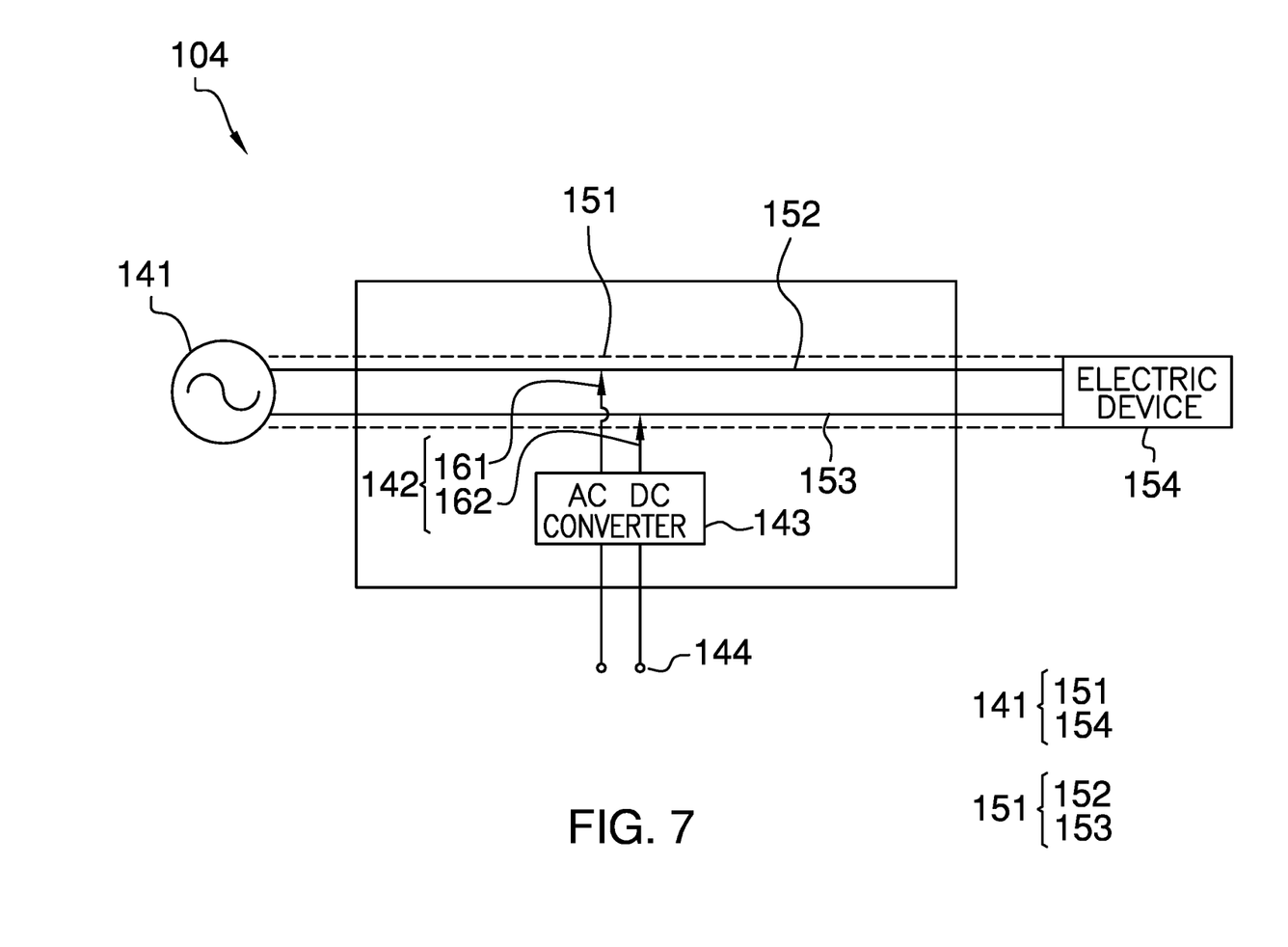
FIG. 7 is a schematic view of an embodiment of the disclosure.

The rectifying circuit 104 is an electric circuit. The rectifying circuit 104 taps into the cable 151 that electrically connects the electric device 154 to the national electric grid 141. The rectifying circuit 104 draws ac electric energy from the cable 151. The rectifying circuit 104 converts the drawn ac electric energy into dc electric energy. The rectifying circuit 104 presents the converted dc electric energy for consumption. The rectifying circuit 104 comprises a national electric grid 141, a plurality of penetrating leads 142, an ac/dc converter 143, and an USB port 144.

The national electric grid 141 is an external power source that provides ac electric energy. The national electric grid 141 is defined elsewhere in this disclosure. The national electric grid 141 further comprises the cable 151 and the electric device 154.

The electric device 154 is an electric load the forms an electric connection with the national electric grid 141 through the cable 151.

The cable 151 is a device that transmits electric energy from the national electric grid 141 to the electric device 154. The cable 151 is an insulated structure. The cable 151 passes through the pan structure 101 and the lid structure 102. The cable 151 is defined elsewhere in this disclosure. The cable 151 further comprises a hot lead 152 and a neutral lead 153. The hot lead 152 is the hot lead 152 connection of the national electric grid 141. The hot lead 152 electrically connects to the plurality of penetrating leads 142. The hot lead 152 is defined elsewhere in this disclosure. The neutral lead 153 is the neutral lead 153 connection of the national electric grid 141. The neutral lead 153 electrically connects to the plurality of penetrating leads 142. The neutral lead 153 is defined elsewhere in this disclosure.

The plurality of penetrating leads 142 is an electrical structure that transports electric energy from the national electric grid 141 to the ac/dc converter 143. The plurality of penetrating leads 142 forms an electric connection with the cable 151. The plurality of penetrating leads 142 punctures the cable 151 such that the plurality of penetrating leads 142 form electrical connections with the hot lead 152 and the neutral lead 153 of the cable 151. The plurality of penetrating leads 142 further comprises a first penetrating lead 161 and a second penetrating lead 162.

The first penetrating lead 161 is an electric termination. The first penetrating lead 161 is structured such that the first penetrating lead 161 cuts through the insulating structure formed by the cable 151. The first penetrating lead 161 forms an electric connection with the hot lead 152 of the cable 151 through the cut formed in the insulating structure. The second penetrating lead 162 is an electric termination. The second penetrating lead 162 is structured such that the second penetrating lead 162 cuts through the insulating structure formed by the cable 151. The second penetrating lead 162 forms an electric connection with the neutral lead 153 of the cable 151 through the cut formed in the insulating structure.

The ac/dc converter 143 is an electric circuit. The ac/dc converter 143 receives ac electric energy from the plurality of penetrating leads 142 and converts the received ac electric energy into dc electric energy that is presented at the USB port 144. The ac/dc converter 143 is defined elsewhere in this disclosure.

The USB port 144 is a port. The USB port 144 receives dc electric energy from the ac/dc converter 143. The USB port 144 is structured to present the converted dc electric energy in a USB compatible form. The USB port 144 transfers the received dc electric energy to a USB device through a USB plug. The terms USB, port, and plug are defined elsewhere in this disclosure.

The following definitions were used in this disclosure:

AC: As used in this disclosure, AC is an acronym for alternating current.

AC/DC Converter: As used in this disclosure, an AC/DC converter is an electrical device that converts an AC voltage into a regulated DC voltage by rectifying and regulating the AC voltage. Method to design and build AC/DC converters are well known in the electrical arts. The AC/DC converter is further defined with a positive terminal, a negative terminal, and a power input.

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Apex: As used in this disclosure, an apex is a vertex that forms an extreme or solitary point of an object.

At a Location Proximal to: As used in this disclosure, the term "at a location proximal to" identifies the position of an object selected from a group relative to an identified location such that the span of distance from the identified location and the selected object is less than the span of distance between the identified location and any object remaining in the group. Stated less formally, at a location proximal to means that the selected object is closer to the identified location than any other object selected from the group.

Blade: As used in this disclosure, a blade is a term that is used to describe: 1) a wide and flat portion of a structure; or, 2) the cutting edge of a tool.

Bolt: As used in this disclosure, a bolt is a cylindrical shaft that is formed with an exterior screw thread. A bolt is defined with an outer diameter.

Bolt Hole: As used in this disclosure, a bolt hole is a prism-shaped disk that is formed with a cylindrical negative space that allows a shaft to be inserted through the faces of the disk. A bolt hole is further defined with an inner diameter.

Brink: As used in this disclosure, a brink refers to the edge or line formed by the intersection of a first plane or surface and a second plane or surface wherein a cant exists between the first plane or surface and the second plane or surface.

Cable: As used in this disclosure, a cable is a collection of one or more insulated wires covered by a protective casing that is used for transmitting electricity or telecommunication signals.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Channel: As used in this disclosure, a channel is a negative space used to guide the motion of an object of through which an object or fluid passes.

Composite Prism: As used in this disclosure, a composite prism refers to a structure that is formed from a plurality of structures selected from the group consisting of a prism structure and a pyramid structure. The plurality of selected structures may or may not be truncated. The plurality of prism structures are joined together such that the center axes of each of the plurality of structures are aligned. The congruent ends of any two structures selected from the group consisting of a prism structure and a pyramid structure need not be geometrically similar.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Correspond: As used in this disclosure, the term correspond is used as a comparison between two or more objects wherein one or more properties shared by the two or more objects match, agree, or align within acceptable manufacturing tolerances.

DC: As used in this disclosure, DC is an acronym for direct current.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Exterior: As used in this disclosure, the exterior is used as a relational term that implies that an object is not contained within the boundary of a structure or a space.

Exterior Screw Thread: An exterior screw thread is a ridge wrapped around the outer surface of a tube in the form of a helical structure that is used to convert rotational movement into linear movement.

External Power Source: As used in this disclosure, an external power source is a source of the energy that is externally provided to enable the operation of the present disclosure. Examples of external power sources include, but are not limited to, electrical power sources and compressed air sources.

Form Factor: As used in this disclosure, the term form factor refers to the size and shape of an object.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1.

Helix: As used in this disclosure, a helix is the three-dimensional structure that would be formed by a wire that is wound uniformly around the surface of a cylinder or a cone. If the wire is wrapped around a cylinder the helix is called a cylindrical helix. If the wire is wrapped around a cone, the helix is called a conical helix. A synonym for conical helix would be a volute.

Hot Lead and Neutral Lead: As used in this disclosure, a hot lead is the source of the electric current that is provided by an ac voltage source. A neutral lead is the return for the electric current that is provisioned through the hot lead back to the ac voltage source.

Housing: As used in this disclosure, a housing is a rigid structure that encloses and protects one or more devices.

Insulating Material: As used in this disclosure, an insulating material is a material that inhibits, and ideally prevents, the transfer of heat through the insulating material. Insulating materials may also be used to inhibit or prevent the transfer of sound or the conduction of electricity through the insulating material. Methods to form insulating materials include, but are not limited to: a) the use of materials with low thermal conductivity; b) the use of materials with low electrical conductivity (or high resistivity); and, c) the use of a structural design that places a vacuum within the insulating material within the anticipated transfer path of the heat, sound, or electric current flow.

Insulating Structure (Electricity): As used in this disclosure, an insulating structure is a structure that inhibits, and ideally prevents, the transfer of electricity through the insulating structure. The insulating structure encloses a space that consumes or transmits electric energy. The insulating structure is formed from an insulating material with low electrical conductivity.

Interior: As used in this disclosure, the interior is used as a relational term that implies that an object is contained within the boundary of a structure or a space.

Interior Screw Thread: An interior screw thread is a groove that is formed around the inner surface of a tube in the form of a helical structure that is used to convert rotational movement into linear movement.

Lead: As used in this disclosure, a lead is a conductor that is physically used to electrically connect an electrical component into a larger circuit assembly.

Lid: As used in this disclosure, a lid is a removable cover that is placed over an opening of a hollow structure to enclose the hollow structure.

National Electric Grid: As used in this disclosure, the national electric grid is a synchronized and highly interconnected electrical network that distributes energy in the form of electric power from a plurality of generating stations to consumers of electricity. The national electric grid is a commercially available source of AC electrical power. The national electric grid is regulated by an appropriate authority. The national electric grid comprises one or more utilities that sell electrical power for use by an electrical load. The national electric grid invoices for electrical power based on the total energy consumed by the electrical load. The national electric grid measures the energy consumption of an electrical load with an electrical meter. The national electric grid provides power through electrical connections known as a hot lead and a neutral lead.

Negative Space: As used in this disclosure, negative space is a method of defining an object through the use of open or empty space as the definition of the object itself, or, through the use of open or empty space to describe the boundaries of an object.

Notch: As used in this disclosure, a notch is: 1) an indentation formed in an edge; or 2) a cavity or aperture formed within a surface.

Nut: As used in this disclosure, a nut is a first object that is formed with a cylindrical negative space that further comprises an interior screw thread such that a second object with a matching exterior screw thread can screwed into the first object forming a threaded connection. A nut is further defined with an inner diameter.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Pan: As used in this disclosure, a pan is a hollow and prism-shaped containment structure. The pan has a single open face. The open face of the pan is often, but not always, the superior face of the pan. The open face is a surface selected from the group consisting of: a) a congruent end of the prism structure that forms the pan; and, b) a lateral face of the prism structure that forms the pan. A semi-enclosed pan refers to a pan wherein the closed end of prism structure of the pan and/or a portion of the closed lateral faces of the pan is are open.

Perimeter: As used in this disclosure, a perimeter is one or more curved or straight lines that bounds an enclosed area on a plane or surface. The perimeter of a circle is commonly referred to as a circumference.

Plug: As used in this disclosure, a plug is an electrical termination that electrically connects a first electrical circuit to a second electrical circuit or a source of electricity. As used in this disclosure, a plug will have two or three metal pins.

Port: As used in this disclosure, a port is an electrical termination that is used to connect a first electrical circuit to a second external electrical circuit. In this disclosure, the port is designed to receive a plug.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Protection Space: As used in this disclosure, a protection space is a space formed by a boundary structure. The boundary structure forms a protective barrier that protects objects outside the protection space from potential dangers from the operation of a device or process contained within the protection space.

Puncture: As used in this disclosure, the verb to puncture means to form an aperture through a surface using an object with a sharpened apex or brink.

Recess: As used in this disclosure, a recess is a disk-shaped negative space that is formed at the congruent end of prism shape of a bolt hole. The recess is positioned relative to the bolt hole to form a composite prism negative space structure. The recess is sized to receive an object, such as the head of a bolt, such that the object is below the plane of the surface in which the bolt hole was formed.

Regulated Voltage: As used in this disclosure, a regulated voltage refers to a source of DC voltage that incorporates circuitry that reduces changes in output voltages that occur in response to changes to the circuit's input power supply voltage or to changes in output, or load, current.

Screw: As used in this disclosure, to screw is a verb meaning: 1) to fasten or unfasten (unscrew) a threaded connection; or 2) to attach a helical structure to a solid structure.

Sharp: As used in this disclosure, the term sharp refers to an apex or a brink that is formed in a first structure that is capable of puncturing or cutting a second structure.

Such As: As used in this disclosure, the term "such as" is a conjunction that relates a first phrase to a subsequent phrase. The term "such as" is used to introduce representative examples of structures that meet the requirements of the first phrase. As a first example of the use of the term "such as," the phrase: "the first textile attaches to the second textile using a fastener such as a hook and loop fastener" is taken to mean that a hook and loop fastener is suitable to use as the fastener but is not meant to exclude the use of a zipper or a sewn seam. As a second example of the use of the term "such as," the phrase: "the chemical substance is a halogen such as chlorine or bromine" is taken to mean that either chlorine or bromine are suitable for use as the halogen but is not meant to exclude the use of fluorine or iodine.

Such That: As used in this disclosure, the term "such that" is a conjunction that relates a first phrase to a subsequent phrase. The term "such that" is used to place a further limitation or requirement to the first phrase. As a first example of the use of the term "such that," the phrase: "the door attaches to the wall such that the door rotates relative to the wall" requires that the attachment of the door allows for this rotation. As a second example of the use of the term "such that," the phrase: "the chemical substance is selected such that the chemical substance is soluble in water" requires that the selected chemical substance is soluble in water. As a third example of the use of the term "such that," the phrase: "the lamp circuit is constructed such that the lamp circuit illuminates when the lamp circuit detects darkness" requires that the lamp circuit: a) detect the darkness; and, b) generate the illumination when the darkness is detected.

Threaded Connection: As used in this disclosure, a threaded connection is a type of fastener that is used to join a first cylindrical object and a second cylindrical object together. The first cylindrical object is fitted with a first fitting selected from an interior screw thread or an exterior screw thread. The second cylindrical object is fitted with the remaining screw thread. The cylindrical object fitted with the exterior screw thread is placed into the remaining cylindrical object such that: 1) the interior screw thread and the exterior screw thread interconnect; and, 2) when the cylindrical object fitted with the exterior screw thread is rotated the rotational motion is converted into linear motion that moves the cylindrical object fitted with the exterior screw thread either into or out of the remaining cylindrical object. The direction of linear motion is determined by the direction of rotation.

USB: As used in this disclosure, USB is an acronym for Universal Serial Bus which is an industry standard that defines the cables, the connectors, the communication protocols and the distribution of power required for interconnections between electronic devices. The USB standard defines several connectors including, but not limited to, USB-A, USB-B, mini-USB, and micro USB connectors. A USB cable refers to a cable that: 1) is terminated with USB connectors; and, 2) that meets the data transmission standards of the USB standard.

With respect to the above description, it is to be realized that the optimum dimensional relationship for the various components of the invention described above and in FIGS. 1 through 7 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. An energy distribution device comprising
a pan structure, a lid structure, a fastening structure, and a rectifying circuit;
wherein the pan structure, the lid structure, and the fastening structure enclose the rectifying circuit;
wherein the rectifying circuit: a) taps into a cable to draw ac electric energy from national electric grid; and, b) converts the drawn ac electric energy into dc electric energy;
wherein the pan structure comprises a pan structure open face, a pan structure closed face, a first pan structure lateral face, and a second pan structure lateral face;
wherein the pan structure open face is a congruent end the pan structure;
wherein the pan structure open face is the open face of the pan structure of the pan structure;
wherein the cable inserts into the pan structure through the pan structure open face;
wherein the pan structure closed face is a congruent end of the pan structure;
wherein the pan structure closed face is the closed face of the pan structure of the pan structure;
wherein the pan structure closed face is the congruent end that is distal from the pan structure open face;
wherein the first pan structure lateral face is the lateral face of the pan structure with the least surface area;
wherein the cable passes through the first pan structure lateral face;
wherein the second pan structure lateral face is the lateral face of the pan structure that is distal from the first pan structure lateral face;
wherein the cable passes through the second pan structure lateral face.

2. The energy distribution device according to claim 1
wherein the energy distribution device draws ac electric energy from the national electric grid by tapping into the cable of an electric device;
wherein the converts the drawn ac electric energy into dc electric energy;
wherein the energy distribution device distributes the dc electric energy.

3. The energy distribution device according to claim 2
wherein the pan structure has a pan shape;
wherein the pan structure is a hollow structure;
wherein the pan structure forms a portion of the housing of the rectifying circuit.

4. The energy distribution device according to claim 3
wherein the lid structure has a pan shape;
wherein the lid structure is a hollow structure;
wherein the lid structure is geometrically similar to the pan structure open face such that the lid structure encloses the pan structure open face.

5. The energy distribution device according to claim 4 wherein the fastening structure secures the lid structure to the pan structure to form a protection space that contains the rectifying circuit.

6. The energy distribution device according to claim 5
wherein the rectifying circuit is an electric circuit;
wherein the rectifying circuit taps into the cable that electrically connects the electric device to the national electric grid;
wherein the rectifying circuit draws ac electric energy from the cable;
wherein the rectifying circuit converts the drawn ac electric energy into dc electric energy;
wherein the rectifying circuit presents the converted dc electric energy.

7. The energy distribution device according to claim 6
wherein the rectifying circuit comprises a national electric grid, a plurality of penetrating leads, an ac/dc converter, and an USB port;
wherein the national electric grid, the plurality of penetrating leads, the ac/dc converter, and the USB port are electrically interconnected.

8. The energy distribution device according to claim 7
wherein the national electric grid is an external power source that provides ac electric energy;
wherein the national electric grid further comprises the cable and the electric device;
wherein the electric device is an electric load the forms an electric connection with the national electric grid through the cable;
wherein the cable is a device that transmits electric energy from the national electric grid to the electric device;
wherein the cable is an insulated structure;
wherein the cable further comprises a hot lead and a neutral lead;
wherein the cable passes through the pan structure and the lid structure;
wherein the hot lead is the hot lead connection of the national electric grid;
wherein the hot lead electrically connects to the plurality of penetrating leads;
wherein the neutral lead is the neutral lead connection of the national electric grid;
wherein the neutral lead electrically connects to the plurality of penetrating leads;
wherein the plurality of penetrating leads is an electrical structure that transports electric energy from the national electric grid to the ac/dc converter;
wherein the plurality of penetrating leads forms an electric connection with the cable;
wherein the plurality of penetrating leads punctures the cable such that the plurality of penetrating leads form electrical connections with the hot lead and the neutral lead of the cable.

9. The energy distribution device according to claim 8
wherein the lid structure comprises a lid structure open face, a lid structure closed face, a first lid structure lateral face, and a second lid structure lateral face;
wherein the lid structure open face is a congruent end of the lid structure;
wherein the lid structure open face is the open face of the pan structure of the lid structure;
wherein the cable inserts into the lid structure through the lid structure open face;
wherein the lid structure closed face is a congruent end of the lid structure;
wherein the lid structure closed face is the closed face of the pan structure of the lid structure;
wherein the lid structure closed face is the congruent end that is distal from the lid structure open face;
wherein the first lid structure lateral face is the lateral face of the lid structure with the least surface area;
wherein the cable passes through the first lid structure lateral face;
wherein the second lid structure lateral face is the lateral face of the lid structure that is distal from the first lid structure lateral face;
wherein the cable passes through the second lid structure lateral face.

10. The energy distribution device according to claim 9
wherein the first pan structure lateral face further comprises a first pan structure notch;
wherein the second pan structure lateral face further comprises a second pan structure notch;
wherein the first pan structure notch is a notch that is formed through the first pan structure lateral face;
wherein the first pan structure notch forms a negative space in the first pan structure lateral face;
wherein the position of the first pan structure notch is at a location proximal to the pan structure open face;
wherein the first pan structure notch is geometrically similar to the cable;
wherein the first pan structure notch is sized such that the cable lays within the first pan structure notch as the cable passes through the first pan structure lateral face;
wherein the second pan structure notch is a notch that is formed through the second pan structure lateral face;
wherein the second pan structure notch forms a negative space in the second pan structure lateral face;
wherein the position of the second pan structure notch is at a location proximal to the pan structure open face;
wherein the second pan structure notch is geometrically similar to the cable;
wherein the second pan structure notch is sized such that the cable lays within the second pan structure notch as the cable passes through the second pan structure lateral face;
wherein the first pan structure notch aligns with the second pan structure notch such that the cable passes straight through the pan structure.

11. The energy distribution device according to claim 10
wherein the fastening structure comprises a first bolt, a second bolt, a first pan structure nut, a second pan structure nut, a first lid structure nut, and a second lid structure nut;

wherein the first bolt is a threaded structure known as a bolt;
wherein the first bolt is formed with an exterior screw thread;
wherein the first bolt secures the lid structure to the pan structure;
wherein the first bolt forms a threaded connection with the lid structure and the pan structure by simultaneously screwing into the first lid structure nut and the first pan structure nut;
wherein the second bolt is a threaded structure known as a bolt;
wherein the second bolt is formed with an exterior screw thread;
wherein the second bolt secures the lid structure to the pan structure;
wherein the second bolt forms a threaded connection with the lid structure and the pan structure by simultaneously screwing into the second lid structure nut and the second pan structure nut;
wherein the first pan structure nut is a threaded structure known as a bolt;
wherein the first pan structure nut is formed with an interior screw thread;
wherein the first pan structure nut is sized to receive the first bolt;
wherein the first pan structure nut mounts in a fixed position within the hollow interior of the pan structure such that the first pan structure nut is accessible to the first bolt through the pan structure open face;
wherein the second pan structure nut is a threaded structure known as a bolt;
wherein the second pan structure nut is formed with an interior screw thread;
second bolt;
wherein the second pan structure nut mounts in a fixed position within the hollow interior of the pan structure such that the second pan structure nut is accessible to the second bolt through the pan structure open face;
wherein the first lid structure nut is a threaded structure known as a bolt;
wherein the first lid structure nut is formed with an interior screw thread;
wherein the first lid structure nut is sized to receive the first bolt;
wherein the first lid structure nut mounts in a fixed position within the hollow interior of the lid structure such that the first lid structure nut is accessible to the first bolt through the lid structure closed face;
wherein the second lid structure nut is a threaded structure known as a bolt;
wherein the second lid structure nut is formed with an interior screw thread;
wherein the second lid structure nut is sized to receive the second bolt;
wherein the second lid structure nut mounts in a fixed position within the hollow interior of the lid structure such that the second lid structure nut is accessible to the second bolt through the pan structure closed face;
wherein the first lid structure nut mounts in a position within the lid structure such that the first pan structure nut aligns with the first lid structure nut when the lid structure encloses the pan structure;
wherein the first lid structure nut aligns with the first pan structure nut such that the first bolt can simultaneously screw through both the first lid structure nut and the first pan structure nut;

wherein the second lid structure nut mounts in a position within the lid structure such that the second pan structure nut aligns with the second lid structure nut when the lid structure encloses the pan structure;
wherein the second lid structure nut aligns with the second pan structure nut such that the second bolt can simultaneously screw through both the second lid structure nut and the first pan structure nut.

12. The energy distribution device according to claim 11
wherein the first lid structure lateral face further comprises a first lid structure notch;
wherein the second lid structure lateral face further comprises a second lid structure notch;
wherein the first lid structure notch is a notch that is formed through the first lid structure lateral face;
wherein the first lid structure notch forms a negative space in the first lid structure lateral face;
wherein the position of the first lid structure notch is at a location proximal to the lid structure open face;
wherein the first lid structure notch is geometrically similar to the cable;
wherein the first lid structure notch is sized such that the cable lays within the first lid structure notch as the cable passes through the first lid structure lateral face;
wherein the second lid structure notch is a notch that is formed through the second lid structure lateral face;
wherein the second lid structure notch forms a negative space in the second lid structure lateral face;
wherein the position of the second lid structure notch is at a location proximal to the lid structure open face;
wherein the second lid structure notch is geometrically similar to the cable;
wherein the second lid structure notch is sized such that the cable lays within the second lid structure notch as the cable passes through the second lid structure lateral face;
wherein the first lid structure notch aligns with the second lid structure notch such that the cable passes straight through the lid structure;
wherein the lid structure open face aligns with the pan structure open face when the lid structure encloses the pan structure;
wherein the first lid structure notch aligns with the first pan structure notch when the lid structure encloses the pan structure;
wherein the second lid structure notch aligns with the second pan structure notch when the lid structure encloses the pan structure;
wherein the first pan structure notch and the first lid structure notch enclose the cable when the lid structure encloses the pan structure;
wherein the second pan structure notch and the second lid structure notch enclose the cable when the lid structure encloses the pan structure.

13. The energy distribution device according to claim 12
wherein the plurality of penetrating leads further comprises a first penetrating lead and a second penetrating lead;
wherein the first penetrating lead is an electric termination;
wherein the first penetrating lead is structured such that the first penetrating lead cuts through the insulating structure formed by the cable;
wherein the first penetrating lead forms an electric connection with the hot lead of the cable through the cut formed in the insulating structure;

wherein the second penetrating lead is an electric termination;

wherein the second penetrating lead is structured such that the second penetrating lead cuts through the insulating structure formed by the cable;

wherein the second penetrating lead forms an electric connection with the neutral lead of the cable through the cut formed in the insulating structure.

14. The energy distribution device according to claim 13 wherein the ac/dc converter is an electric circuit;

wherein the ac/dc converter receives ac electric energy from the plurality of penetrating leads and converts the received ac electric energy into dc electric energy.

15. The energy distribution device according to claim 14 wherein the USB port is a port;

wherein the USB port receives dc electric energy from the ac/dc converter;

wherein the USB port is structured to present the converted dc electric energy in a USB compatible form;

wherein the USB port transfers the received dc electric energy to a USB device through a USB plug.

\* \* \* \* \*